(12) United States Patent
Fisher et al.

(10) Patent No.: US 11,686,420 B2
(45) Date of Patent: Jun. 27, 2023

(54) PRE-INSULATED FLEXIBLE HOT WATER PIPE

(71) Applicant: Fisher Tallent, LLC, Las Vegas, NV (US)

(72) Inventors: Charles Joseph Fisher, Beaumont, CA (US); Jimmy Ray Tallent, Hemet, CA (US)

(73) Assignee: Fisher Tallent, LLC, Las Vegas, NV (US)

( * ) Notice: Subject to any disclaimer, the term of this patent is extended or adjusted under 35 U.S.C. 154(b) by 297 days.

(21) Appl. No.: 17/171,783

(22) Filed: Feb. 9, 2021

(65) Prior Publication Data

US 2021/0301969 A1 Sep. 30, 2021

Related U.S. Application Data

(60) Provisional application No. 63/002,219, filed on Mar. 30, 2020.

(51) Int. Cl.
| | | |
|---|---|---|
| *F16L 59/02* | (2006.01) | |
| *F16L 59/14* | (2006.01) | |
| *B32B 1/08* | (2006.01) | |
| *B32B 5/18* | (2006.01) | |
| *B32B 27/06* | (2006.01) | |
| *B32B 27/32* | (2006.01) | |

(52) U.S. Cl.
CPC ............. *F16L 59/029* (2013.01); *B32B 1/08* (2013.01); *B32B 5/18* (2013.01); *B32B 27/065* (2013.01); *B32B 27/32* (2013.01); *F16L 59/028* (2013.01); *F16L 59/143* (2013.01); *B32B 2255/10* (2013.01); *B32B 2255/26* (2013.01); *B32B 2266/025* (2013.01); *B32B 2597/00* (2013.01)

(58) Field of Classification Search
CPC ......... F16L 9/14; F16L 59/153; F16L 59/028; F16L 59/029; F16L 59/10; F16L 59/143
USPC .......................... 138/123–126, 137, 140, 149
See application file for complete search history.

(56) References Cited

U.S. PATENT DOCUMENTS

| | | | |
|---|---|---|---|
| 3,460,579 A | 8/1969 | Clarkson | |
| 4,431,031 A * | 2/1984 | Ettlinger | E03C 1/025 138/124 |
| 4,921,018 A | 5/1990 | Dridi et al. | |
| 2008/0110519 A1 | 5/2008 | Gorilovskiy et al. | |
| 2010/0218839 A1* | 9/2010 | Conley | B32B 27/32 138/137 |
| 2011/0041944 A1* | 2/2011 | Duquette | F16L 9/147 138/140 |
| 2016/0245451 A1 | 8/2016 | Okada et al. | |
| 2021/0396344 A1* | 12/2021 | Pilone | F16L 59/153 |

FOREIGN PATENT DOCUMENTS

| | | |
|---|---|---|
| CN | 107152569 A | 9/2017 |
| GB | 1001043 A | 8/1965 |
| WO | 2017000010 A1 | 1/2017 |

* cited by examiner

*Primary Examiner* — Patrick F Brinson
(74) *Attorney, Agent, or Firm* — Procopio Cory Hargreaves and Savitch LLP

(57) ABSTRACT

A pre-insulated flexible hot water pipe comprising a flexible pipe core; a flexible insulator surrounding the flexible pipe core; and a coating surrounding the flexible insulator.

14 Claims, 2 Drawing Sheets

PRE-INSULATED FLEXIBLE HOT WATER PIPE

FIELD OF THE INVENTION

The present invention relates to insulated hot water pipes.

BACKGROUND OF THE INVENTION

It is commonplace to have to wait for water from a sink, tub, or shower to warm up after the hot water is turned on. Not only can this be an inconvenience, the negative economic and environmental consequences resulting from wasted water caused by waiting for water to warm up is staggering. The average home has approximately 125 feet of ⅝ inch pipe running from the hot water heater to faucets or showers. This accounts for about 3.14 gallons of water sitting dormant in the pipe when the water is not on. If the hot water is used ten times per day, 31.4 gallons of water is wasted per day per house. This results in 11,461 gallons of water per year per house wasted just waiting for the water to get warm. The 2014-2018 census reported 718,349 households in Riverside County in CA. Thus, over 8 billion (8,232,997,889) gallons of water was wasted in Riverside County alone in one year. Just reducing the volume of wasted water by 25% would result in an extra 2 billion gallons of water per year in Riverside County. Consequently, this wasted water has an enormous negative impact on the environment, economy, and energy consumption worldwide.

SUMMARY OF THE INVENTION

An aspect of the invention involves a pre-insulated flexible hot water pipe comprising a flexible pipe core; a flexible insulator surrounding the flexible pipe core; and a coating surrounding the flexible insulator.

One or more implementations of the aspect of the invention described immediately above includes one or more of the following: the flexible pipe core is made of a crosslinked polyethylene; the flexible insulator is an insulated rubber coating; the coating surrounding the flexible insulator is made of a flexible polyvinyl chloride; a foam insulation surrounds the insulated rubber coating, and the coating surrounding the flexible insulator surrounds the foam insulation; the flexible pipe core is made of a crosslinked polyethylene, the flexible insulator is an insulated rubber coating, and the coating surrounding the flexible insulator is made of a flexible polyvinyl chloride; a foam insulation surrounds the insulated rubber coating, and the coating surrounding the flexible insulator surrounds the foam insulation.

Another aspect of the invention involves a method of using the pre-insulated flexible hot water pipe of the aspect of the invention described above, comprising: receiving hot water at a first temperature in the pre-insulated flexible hot water pipe; maintaining the temperature of the hot water sitting in the pre-insulated flexible hot water pipe to within 25 degrees F. of the first temperature at 60 minutes from when the hot water was received in the pre-insulated flexible hot water pipe.

One or more implementations of the aspect of the invention described immediately above includes one or more of the following: maintaining the temperature of the hot water sitting in the pre-insulated flexible hot water pipe to within 35 degrees F. of the first temperature at 120 minutes from when the hot water was received in the pre-insulated flexible hot water pipe the flexible pipe core is made of a crosslinked polyethylene; the flexible insulator is an insulated rubber coating; the coating surrounding the flexible insulator is made of a flexible polyvinyl chloride; a foam insulation surrounds the insulated rubber coating, and the coating surrounding the flexible insulator surrounds the foam insulation; the flexible pipe core is made of a crosslinked polyethylene, the flexible insulator is an insulated rubber coating, and the coating surrounding the flexible insulator is made of a flexible polyvinyl chloride; a foam insulation surrounds the insulated rubber coating, and the coating surrounding the flexible insulator surrounds the foam insulation.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 1:
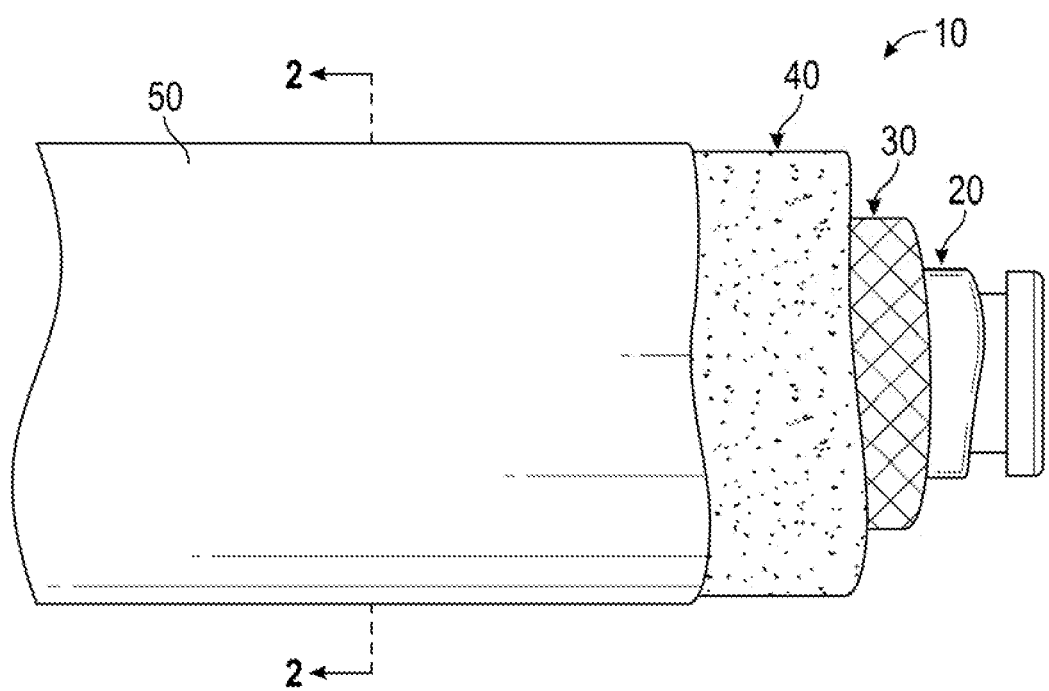
FIG. 1 is a front elevational view of an embodiment of a pre-insulated flexible hot water pipe, with portions of the pipe shown removed.
Figure 2:
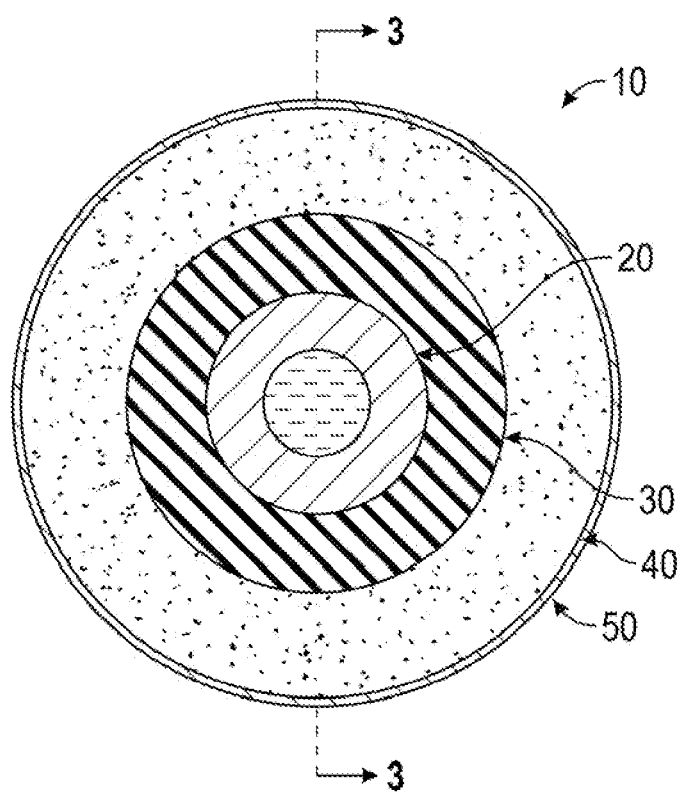
FIG. 2 is a cross-sectional view of the pre-insulated flexible hot water pipe of FIG. 1 taken along line 2-2.
Figure 3:
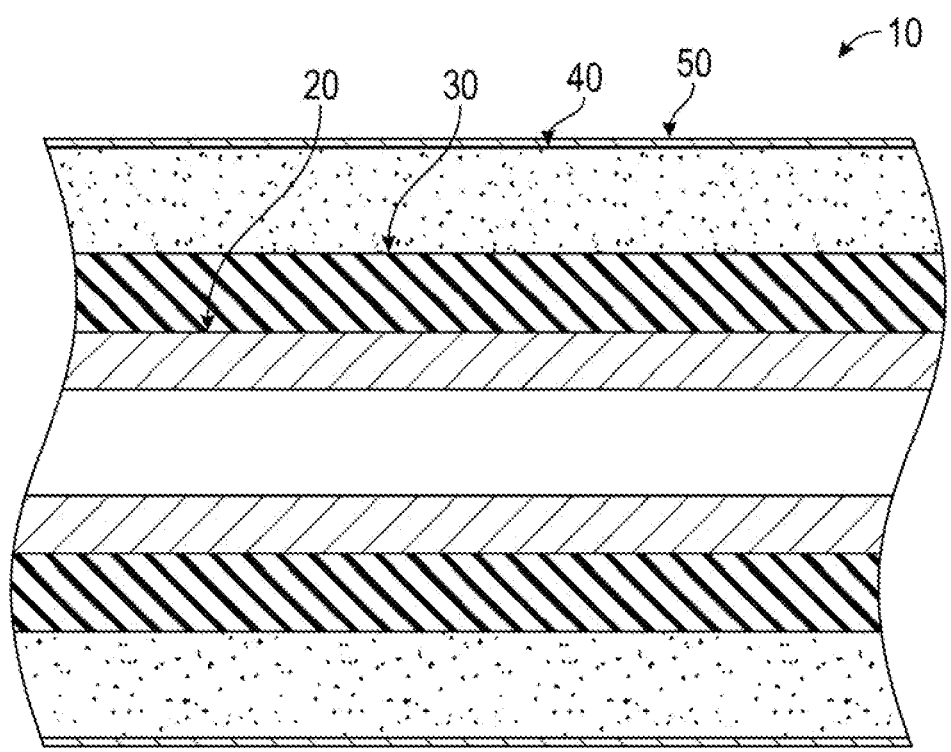
FIG. 3 is a cross-sectional view of the pre-insulated flexible hot water pipe of FIG. 2 taken along line 3-3.

With reference to FIGS. 1-3, an embodiment of a pre-insulated flexible hot water pipe 10 for keeping water warmer for a longer period of time will be described.

The pre-insulated flexible hot water pipe 10 includes, progressing radially outward, a crosslinked polyethylene ("PEX") tubing/pipe core (e.g., ⅝ in. PEX pipe) 20 that hot water flows through, a rubber insulated rubber coating/protective insulation (e.g., ⅛ in. radial thickness, ⅞ in. outside diameter, ⅝ in. inside diameter) 30 covering the PEX pipe 20, a polyethylene foam insulation (e.g., ¼ in.) 40 covering the rubber protective insulation 30, and a flexible polyvinyl chloride ("PVC") coating 50 covering the polyethylene foam insulation 40.

The insulation offered by the pre-insulated flexible hot water pipe 10 is what makes the pre-insulated flexible hot water pipe 10 work so well. With no insulation, water in a regular manufactured PEX pipe returns to room temperature within 30 to 32 minutes. After testing multiple constructions for insulating PEX pipe, the shown/described combination for the pre-insulated flexible hot water pipe 10 keeps the pipe flexible and holds the water temperature higher and longer. With the pre-insulated flexible hot water pipe 10, 120 degree water was placed in the pipe 10, and checked at the 60 and 120 minute mark over 10 tests. After 60 minutes, the average water temperature in the pipe remained at 96.3 degrees F. and after 120 minutes was still 87.6 degrees F.

The figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A method of using a pre-insulated flexible hot water pipe comprising a flexible pipe core, a flexible insulator surrounding the flexible pipe core, a coating surrounding the flexible insulator, comprising:
   receiving hot water at a first temperature in the pre-insulated flexible hot water pipe;
   maintaining the temperature of the hot water sitting in the pre-insulated flexible hot water pipe to within 25 degrees F. of the first temperature at 60 minutes from when the hot water was received in the pre-insulated flexible hot water pipe.

2. A method of using a pre-insulated flexible hot water pipe comprising a flexible pipe core, a flexible insulator surrounding the flexible pipe core, a coating surrounding the flexible insulator, comprising:
   receiving hot water at a first temperature in the pre-insulated flexible hot water pipe;
   maintaining the temperature of the hot water sitting in the pre-insulated flexible hot water pipe to within 35 degrees F. of the first temperature at 120 minutes from when the hot water was received in the pre-insulated flexible hot water pipe.

3. The method of claim 1, wherein the flexible pipe core is made of a crosslinked polyethylene.

4. The method of claim 1, wherein the flexible insulator is an insulated rubber coating.

5. The method of claim 1, wherein the coating surrounding the flexible insulator is made of a flexible polyvinyl chloride.

6. The method of claim 1, further including a foam insulation surrounding the insulated rubber coating, and the coating surrounding the flexible insulator surrounds the foam insulation.

7. The method of claim 1, wherein the flexible pipe core is made of a crosslinked polyethylene, the flexible insulator is an insulated rubber coating, and the coating surrounding the flexible insulator is made of a flexible polyvinyl chloride.

8. The method of claim 7, further including a foam insulation surrounding the insulated rubber coating, and the coating surrounding the flexible insulator surrounds the foam insulation.

9. The method of claim 2, wherein the flexible pipe core is made of a crosslinked polyethylene.

10. The method of claim 2, wherein the flexible insulator is an insulated rubber coating.

11. The method of claim 2, wherein the coating surrounding the flexible insulator is made of a flexible polyvinyl chloride.

12. The method of claim 2, further including a foam insulation surrounding the insulated rubber coating, and the coating surrounding the flexible insulator surrounds the foam insulation.

13. The method of claim 2, wherein the flexible pipe core is made of a crosslinked polyethylene, the flexible insulator is an insulated rubber coating, and the coating surrounding the flexible insulator is made of a flexible polyvinyl chloride.

14. The method of claim 13, further including a foam insulation surrounding the insulated rubber coating, and the coating surrounding the flexible insulator surrounds the foam insulation.

* * * * *